(12) United States Patent
Lim et al.

(10) Patent No.: US 12,122,215 B2
(45) Date of Patent: Oct. 22, 2024

(54) DEVICE FOR PROTECTING AN AIR CONDITIONING SYSTEM OF A VEHICLE

(71) Applicants: HYUNDAI MOTOR COMPANY, Seoul (KR); KIA CORPORATION, Seoul (KR)

(72) Inventors: Tae Woong Lim, Hwaseong-si (KR); Hyun Kyun Jung, Seoul (KR); Ji Wan Son, Yongin-si (KR); Han Sol Mun, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 325 days.

(21) Appl. No.: 17/838,963

(22) Filed: Jun. 13, 2022

(65) Prior Publication Data

US 2022/0396119 A1 Dec. 15, 2022

(30) Foreign Application Priority Data

Jun. 14, 2021 (KR) ........................ 10-2021-0076830

(51) Int. Cl.
*B60H 1/00* (2006.01)

(52) U.S. Cl.
CPC ..... *B60H 1/00585* (2013.01); *B60H 1/00807* (2013.01)

(58) Field of Classification Search
CPC ............ B60H 1/00585; B60H 1/00807; B60H 2001/325; B60H 2001/3266; B60H 1/3216; B60H 1/3225; B60H 1/00642; B60H 1/0073; B60H 1/00735; B60H 1/00764; B60H 1/00785; B60H 1/00792; B60H 1/00878; B60H 1/00978; B60H 1/3205; B60H 1/3208; B60H 2001/3238; B60H 2001/3248; B60H 2001/3255; B60H 2001/327

See application file for complete search history.

(56) References Cited

FOREIGN PATENT DOCUMENTS

| JP | 2013133966 A | 7/2013 | |
|---|---|---|---|
| KR | 100527927 B1 | 11/2005 | |
| WO | WO-2020113949 A1 * | 6/2020 | ............ F25B 49/005 |

* cited by examiner

*Primary Examiner* — Kun Kai Ma
(74) *Attorney, Agent, or Firm* — Lempia Summerfield Katz LLC

(57) ABSTRACT

A device for protecting an air conditioning system of a vehicle is configured to prevent damage to an air conditioning system due to excessive operation of a compressor or a deficit of a refrigerant by accurately determining whether to operate the compressor even without using a specific sensor that causes an increase in the manufacturing cost of a vehicle.

10 Claims, 3 Drawing Sheets

DEVICE FOR PROTECTING AN AIR CONDITIONING SYSTEM OF A VEHICLE

CROSS REFERENCE TO RELATED APPLICATION

The present application claims priority to Korean Patent Application No. 10-2021-0076830, filed Jun. 14, 2021, the entire contents of which are incorporated herein for all purposes by this reference.

BACKGROUND

Field of the Disclosure

The present disclosure relates to a device for protecting air conditioning system of a vehicle and, more particularly, to a device for protecting an air conditioning system of a vehicle from excessive operation of a compressor.

Description of the Related Art

In general, vehicles are equipped with an air conditioning system for controlling the temperature, humidity, etc, of the interior air. The air conditioning system can discharge cold air or hot air to the interior of a vehicle, depending on the temperature the vehicle.

The air conditioning system compresses a refrigerant using a compressor when it is operated, in a cooling mode. The compressor may be operated by the power transmitted from the engine through the crankshaft of the engine.

In the related art, a sensor was used to obtain information about refrigerant discharge pressure of the compressor and the information about the refrigerant discharge pressure obtained through the sensor was used to prevent damage to the air conditioning system due to excessive operation of the compressor or a deficit of the refrigerant. When a compressor is excessively operated, pressure exceeding endurance pressure is generated, so the air conditioning system may be damaged. Further, when the refrigerant is insufficient due to leakage of the refrigerant from the air conditioning system, damage may be generated due to insufficient lubrication of the air conditioning system.

Air conditioning systems of the related art were designed, to prevent burnout of a compressor and damage to the air conditioning systems by stopping operation of the compressor when the refrigerant discharge pressure of the compressor exceeds a predetermined allowable pressure range.

However, when a specific sensor is used to measure the refrigerant discharge pressure of a compressor, there is a problem that the manufacturing cost of a vehicle is increased due to the sensor.

SUMMARY

The present disclosure has been made in an effort to solve the problems described above. An objective of the present disclosure is to provide a device for protecting an air conditioning system of a vehicle. The device is configured to prevent damage to an air conditioning system due to excessive operation of a compressor or a deficit of a refrigerant by accurately determining whether to allow the compressor to be driven even without using a specific sensor that causes an increase of the manufacturing cost of a vehicle.

The objectives of the present disclosure are not limited to those described above. Other objectives not stated herein may be understood through the following description and may be made clear by embodiments of the present disclosure. Further, the objectives of the present disclosure are achieved by the configurations described in the claims and combinations thereof.

A device for protecting an air conditioning system of a vehicle for achieving the objectives of the present disclosure described above is a device for protecting an air conditioning system for controlling the state of the air in a vehicle and includes the following configurations.

A device for protecting an air conditioning system of the present disclosure includes a pressure estimator configured to estimate a refrigerant discharge pressure of a compressor for the air conditioning system on the basis of, i.e., based on predetermined vehicle information and air conditioning system information and configured to determine the estimated refrigerant discharge pressure as an estimation discharge pressure of the compressor. The device also includes a dual pressure switch configured to selectively operate, depending on the refrigerant discharge pressure of the compressor, and configured to transmit a cutting-off request signal for cutting off the compressor when the refrigerant discharge pressure of the compressor is not included in a predetermined allowable pressure range of the dual pressure switch. The device further includes an operation controller configured to determine whether to allow the compressor to be driven and to selectively drive the compressor based, on the estimation discharge pressure determined by the pressure estimator, whether the dual pressure switch has transmitted a cutting-off request signal, and the accumulated number of times of transmitting the cutting-off request signal of the dual pressure switch, when it is required to drive the compressor.

The operation controller may determine a driving-allowance standby time based on the accumulated number of times of transmitting the cutting-off request signal of the dual pressure switch when a first condition and a second condition are satisfied. The first condition is whether the estimation discharge pressure is included in the predetermined allowable pressure range of the compressor and the second condition is whether the dual pressure switch does not transmit a cutting-off request signal. The operation controller may also allow the compressor to be driven and drives the compressor when an actual non-operation maintenance time of the compressor exceeds the driving-allowance standby time.

The operation controller may not allow the compressor to be driven and may keep the compressor in a non-operation state when the actual non-operation maintenance time of the compressor is the driving-allowance standby time or less.

The operation controller may not allow the compressor to be driven and may keep the compressor in a non-operation state when even any one of the first condition and the second condition is not satisfied.

The operation controller may keep the compressor in an operation state when the first condition and the second, condition are both satisfied with the compressor in operation.

The operation controller may cut off the compressor when even any one of the first condition and the second condition is not satisfied with the compressor in operation.

The device for protecting an air conditioning system may further include an estimation map corrector configured to correct a discharge pressure estimation map of the pressure estimator based on a difference between an operation pressure of the dual pressure switch and the estimation discharge pressure of the compressor when the difference is a predetermined reference error or more. The pressure estimator may have the discharge pressure estimation map configured to determine the estimation discharge pressure of the compressor using the predetermined vehicle information and air conditioning system information as input variables.

The operation pressure of the dual pressure switch may be determined based on transmission signal information and operation pressure range information of the dual pressure switch. The operation pressure range information of the dual pressure switch may be determined as any one of a high-pressure range and a low-pressure range based on the real-time vehicle information and the real-time air conditioning system information.

The estimation map corrector may determine the operation pressure range information of the dual pressure switch based on vehicle information and air conditioning system information determined to be the same as input variables of the discharge pressure estimation map. The transmission signal of the dual pressure switch may be any one of a cutting-off request signal or a cutting-off cancel request signal.

The present disclosure provides the following effects through the objectives described above.

First, it is possible to prevent damage to the air conditioning system due to excessive operation of the compressor or a deficit of a refrigerant by determining whether to allow the compressor to be driven using the estimation discharge pressure of the compressor and the dual pressure switch.

Second, since estimation discharge pressure information of the compressor is used instead of detecting the refrigerant discharge pressure of the compressor through a specific sensor, it is possible to reduce the manufacturing cost of a vehicle by excluding use of the sensor.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Hereinafter, embodiments of the present disclosure are described in detail with reference to the accompanying drawings. The configurations shown in the accompanying drawings are provided to easily describe embodiments of the present disclosure and may be different from actual configurations.

Throughout the present specification, unless explicitly described otherwise, "comprising" any components should be understood to imply the inclusion of other components rather than the exclusion of any other components.

Further, in the specification, components are distinguished by terms "first", "second", etc. for distinguishing components having the same name without limiting the order. When a component, device, element, or the like of the present disclosure is described as having a purpose or performing an operation, function, or the like, the component device, or element should be considered herein as being "configured to" meet that purpose or to perform, that operation or function.

The present disclosure relates to a device for protecting an air conditioning system of a vehicle. The device is configured to prevent damage to a compressor or damage to the air conditioning system due to excessive operation of the compressor or a deficit of a refrigerant. The device determines whether to allow the compressor of the air conditioning system to be driven again without using a sensor for detecting pressure that would otherwise cause a manufacturing cost increase of a vehicle.

Figure 1:
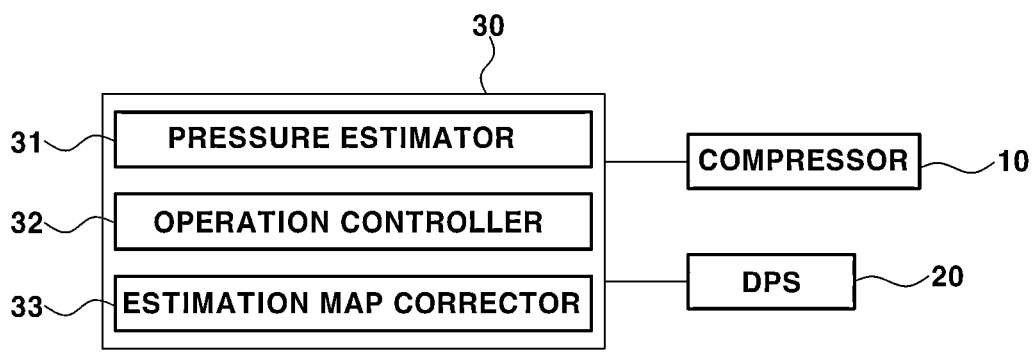
FIG. 1 is a configuration view showing a device for protecting an air conditioning system according to an embodiment of the present disclosure.

Referring to FIG. 1, a device for protecting an air conditioning system of a vehicle according to the present disclosure may include a dual pressure switch (DPS) 20 that can selectively stop operation of a compressor 10 for an air conditioning system. The device may also include an air conditioning system controller 30 that generally controls the air conditioning system.

The compressor 10 is a compressor disposed in the air conditioning system to control the state of the air in a vehicle. The air conditioning system is configured to be able to supply air to the interior of a vehicle after controlling the temperature, humidity, etc. of intake air. For example, the air conditioning system can discharge cold air or hot air to the interior of a vehicle. It is selectively required to drive the compressor 10 when the air conditioning system is driven.

The air conditioning system uses a refrigerant to control the state of the air in a vehicle and the compressor 10 is configured to be able to compress the refrigerant of the air conditioning system. The compressor is selectively driven to compress and discharge the refrigerant of the air conditioning system when the air conditioning system is driven. In detail, the compressor 10 can compress a low-temperature low-pressure gas-state refrigerant discharged from an evaporator of the air conditioning system into a high-temperature high-pressure gas-state refrigerant and can discharge the compressed high-temperature high-pressure gas-state refrigerant to a condenser of the air conditioning system.

The compressor 10 may be a mechanical compressor mechanically connected with the crankshaft of an engine and receiving torque from the engine and can be driven by power from the engine. The compressor 10 may be electric compressor that is driven by power from a power source in a vehicle.

The DPS 20 is a switch configured to be selectively operated by the actual refrigerant discharge pressure of the compressor 10. The DPS 20 may be configured to be operated by a refrigerant suction pressure of the compressor 10 instead of the refrigerant discharge pressure of the compressor 10.

The DPS 20 is configured to cut off the compressor 10 when the actual refrigerant discharge pressure of the compressor 10 is not in a predetermined allowable pressure range of the DPS 20.

The DPS 20 is turned on and gives a request for cutting off the compressor 10 when the actual refrigerant discharge pressure of the compressor 10 is not in the predetermined allowable pressure range. When the DPS 20 is turned on, the DPS 20 can transmit a signal of requesting cutting-off of the compressor 10 (i.e., a cutting-off request signal) to the air conditioning system controller 30.

Pressure values larger than a predetermined first, critical pressure and smaller than a predetermined second critical pressure are included in the allowable pressure range of the DPS 20. The first critical pressure is a low-pressure critical value of the DPS 20 and the second critical pressure is a high-pressure critical value of the DPS 20. The first critical pressure is a pressure value lower than the second critical pressure.

When the actual refrigerant discharge pressure of the compressor 10 is the first critical pressure or lower or is the second critical pressure or higher, the DPS 20 can cut off the compressor 10 by transmitting the cutting-off request signal to the air conditioning system controller 30.

For example, when receiving the cutting-off request signal from the DPS 20, the air conditioning system controller 30 determines a target speed (RPM) of the compressor 10 as 0 (zero) and controls the operation of the compressor 10 such that the compressor 10 follows the target speed, thereby being able to cut off (i.e., turn off) the compressor 10.

The DPS 20 may be a high-low pressure cutting-off switch configured by combining a High Pressure cut out Switch (HPS) and a Low Pressure cut out Switch (LPS).

Referring to FIG. 1, in the present disclosure, the air conditioning system controller 30 may include a pressure estimator 31, an operation controller 32, and an estimation map corrector 33.

The pressure estimator 31 is configured to estimate and determine the refrigerant discharge pressure of the compressor 10. The pressure estimator 31 estimates the refrigerant discharge pressure of the compressor 10 and determines the estimated refrigerant discharge pressure as an estimation discharge pressure.

The pressure estimator 31 may be configured to determine the estimation discharge pressure of the compressor 10 using a discharge pressure estimation map. The pressure estimator 31 may have the discharge pressure estimation map configured to determine the estimation discharge pressure of the compressor 10.

Figure 2:
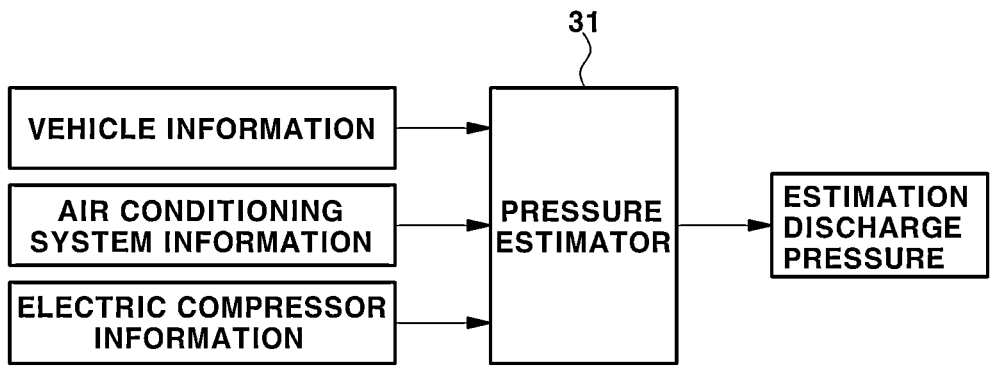
FIG. 2 is a view showing information that is used to determine an estimation discharge pressure of a compressor by a pressure estimator of a configuration of the device for protecting an air conditioning system according to the present disclosure.

The discharge pressure estimation map may be configured to determine the estimation discharge pressure of the compressor 10 based on predetermined input variables and to be stored in the pressure estimator 31. Referring to FIG. 2, predetermined vehicle information and predetermined, air conditioning system information are included in the input variables of the discharge pressure estimation map.

The predetermined vehicle information includes a vehicle speed, the temperature of air outside a vehicle, the temperature of an engine coolant, the revolutions per minute (RPM) of a radiator fan, the time for which a starting state is maintained after an engine is started, etc. The predetermined air conditioning system information includes the temperature of the evaporator of the air conditioning system, the RPM of a blower motor, the time for which the operation state is maintained after the compressor 10 is started, the time for a stop state is maintained after the compressor 10 is cut off, etc.

When the compressor 10 is an electric compressor, the RPM, power consumption, etc. of the electric compressor may be additionally included in the discharge pressure estimation map. The RPM and the power consumption of the electric compressor may be included in the air conditioning system information.

The operation controller 32 is configured to determine whether to allow the compressor 10 to be driven after the engine is started. The operation controller 32 determines whether to allow the compressor 10 to be driven based on the estimation discharge pressure of the compressor 10 determined by the pressure estimator 31, whether the DPS 20 has transmitted a cutting-off request signal, and the accumulated number of times of operation of the DPS 20.

The operation controller 32 determines whether to allow the compressor 10 to be driven based on the information of the estimation discharge pressure of the compressor 10, the information of whether the DPS 20 has transmitted a cutting-off request signal, and the information of the accumulated number of times of operation of the DPS 20. Accordingly, it is possible to obtain accuracy and reliability at a level corresponding to that of determining whether to allow the compressor 10 to be driven based on a sensing value. The sensing value is a value obtained by detecting the refrigerant discharge pressure of the compressor 10 using a sensor for detecting pressure, etc.

The allowable pressure range of the compressor 10 may be determined as a pressure value between the low-pressure critical value and the high-pressure critical value for stable operation of the compressor 10. In detail, the allowable pressure range of the compressor 10 may be determined as a pressure value larger than a third critical pressure and smaller than a fourth critical pressure. The third critical pressure is a pressure value lower than the fourth critical pressure.

The third critical pressure is a pressure value higher than the first critical value of the DPS 20 and the fourth critical pressure is a pressure value lower than the second pressure value of the DPS 20. In other words, the magnitudes of the critical pressure satisfy "first critical pressure < third critical pressure < fourth critical pressure < second critical pressure".

Accordingly, the allowable pressure range of the DPS 20 is wider than the allowable pressure range of the compressor 10. Therefore, when whether to allow the compressor 10 to be driven is determined based on only whether the DPS 20 has transmitted a cutting-off request signal, the operation controller 32 may allow the compressor 10 to be driven even though the actual refrigerant discharge pressure of the compressor 10 is not included in the allowable pressure range of the compressor 10. When the actual refrigerant discharge pressure of the compressor 10 is not included in the allowable pressure range of the compressor 10 and the compressor 10 is allowed to be driven, the compressor 10 may be damaged.

Further, since the estimation discharge pressure of the compressor 10 is a pressure value estimated based on predetermined information, the accuracy is slightly lower than a sensing value. Accordingly, the actual refrigerant discharge pressure of the compressor 10 may not be included in the allowable pressure range of the compressor 10 even though the estimation discharge pressure is included in the allowable pressure range of the compressor 10.

Accordingly, in order to secure the same level of accuracy as when determining whether to allow the compressor 10 to be driver based or a sensing value, the operation controller 32 determines whether to allow the compressor 10 to be driven based on the information of the accumulated number of times of operation of the DPS 20 after an engine is started together with the information of the estimation discharge pressure of the compressor 10 and the information of whether the DPS 20 has transmitted a cutting-off request signal.

The accumulated number of times of operation of the DPS 20 is counted after an engine is started. The operation controller 32 may include a counter for counting the accumulated number of times of operation of the DPS 20.

When the accumulated number of times of operation of the DPS 20 is large, it means that the possibility that the actual refrigerant discharge pressure of the compressor 10 approaches the first critical pressure or the second critical pressure of the DPS 20 when the compressor 10 is driven is high.

In other words, the larger the accumulated number of times of operation of the DPS 20, the higher the possibility that the actual refrigerant discharge pressure of the compressor 10 is not included in the allowable pressure range of the compressor 10. In detail, the larger the accumulated number of times of operation of the DPS 20, the higher the possibility that the actual refrigerant discharge pressure of the compressor 10 is a pressure value between the first critical value and the third critical value or a pressure value between the fourth critical value and the second, critical value.

When the actual refrigerant discharge pressure of the compressor 10 is not included in the allowable pressure range of the compressor 10, frequent driving of the compressor 10 may cause damage to the compressor 10. Accordingly, it is required to reduce the possibility of damage to the compressor and prevent damage to the compressor 10 by selectively cutting off the compressor 10 or delaying the point in time of driving the compressor 10, depending on the accumulated number of times of operation of the DPS 20.

Figure 3:
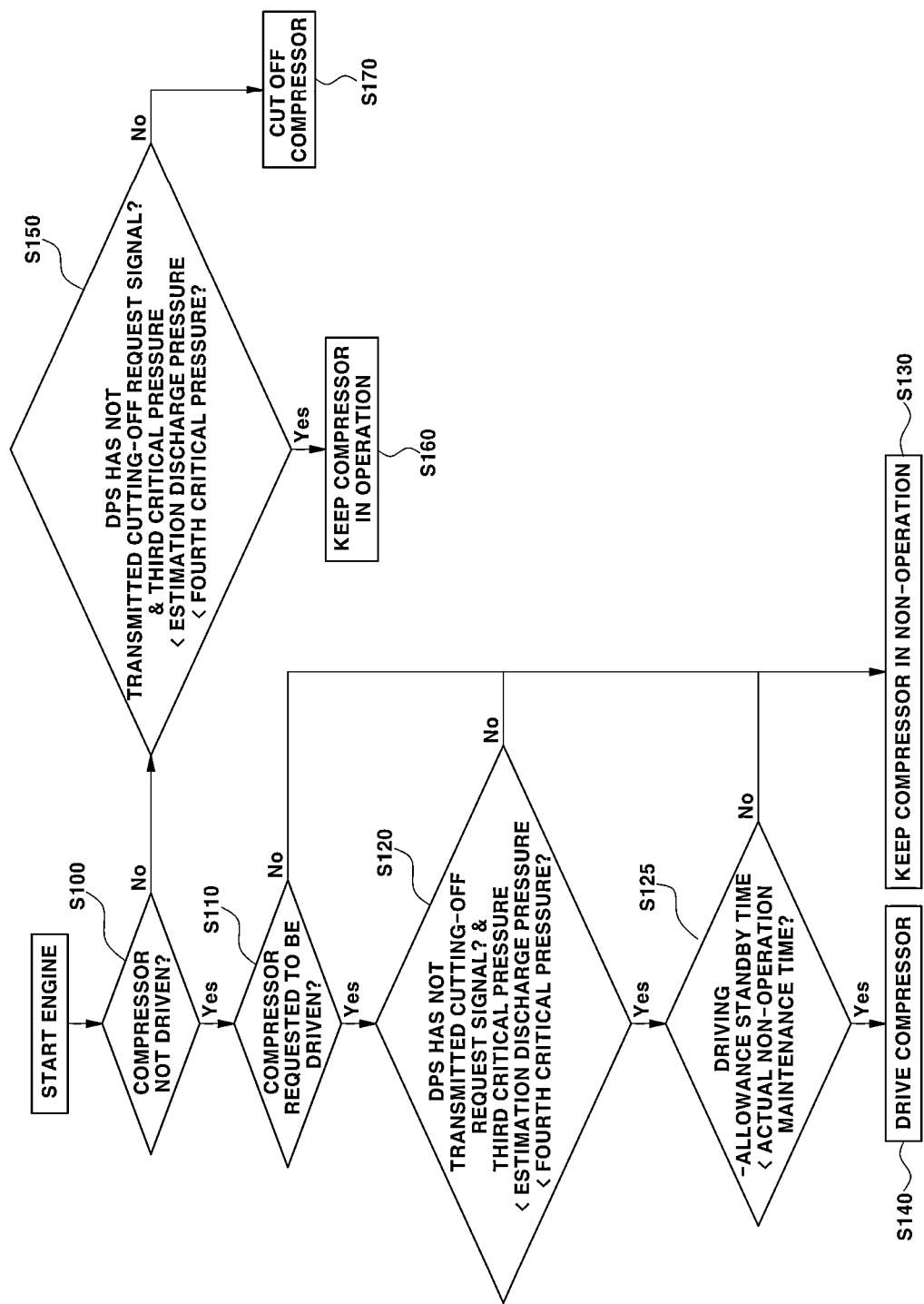
FIG. 3 is a view showing a method of determining whether to allow a compressor to be driven by means of an operation controller of a configuration of the device for protecting an air conditioning system according to the present disclosure.

The process of the operation controller 32 determining whether to allow the compressor 10 to be driven and selectively driving the compressor 10 is described in detail hereafter with reference to FIG. 3.

As shown in FIG. 3, the operation controller 32 can determine whether the compressor 10 is in a non-operation state (i.e., in a stop state) after an engine is started (S100).

The operation controller 32 determines whether there is a request for driving the compressor 10 when the compressor 10 is in a non-operation state (S110). For example, the compressor 10 may be requested to be driven when a user gives a request for driving the air conditioning system.

When recognizing that the compressor 10 is requested to be driven, first, the operation controller 32 primarily determines whether to allow the compressor 10 to be driven based on the estimation discharge pressure of the compressor 10 and whether the DPS 20 has transmitted a cutting-off request signal (S120).

The operation, controller 32 can receive the estimation discharge pressure of the compressor 10 from the pressure estimator 31 and can receive the cutting-off request signal from the DPS 20.

When a first condition that the estimation discharge pressure is included in the allowable pressure range of the compressor 10 and a second condition that the DPS 20 does not transmit a cutting-off request signal are both satisfied, the operation controller 32 primarily allows the compressor 10 to be driven.

When even any one of the first condition and the second condition is not satisfied, the operation controller 32 does not allow the compressor 10 to be driven. In other words, when even any one of the first condition and the second condition is not satisfied, the operation controller 32 keeps the compressor 10 in the non-operation state (S130).

When the operation controller 32 primarily allows the compressor 10 to be driven, the operation controller 32 secondarily finally determines whether to allow the compressor 10 to be driven based on the accumulated number of times of operation of the DPS 20. When an engine is started, the operation controller 32 counts and stores in real time the accumulated number of times of operation of the DPS 20.

Even though the compressor 10 is primarily allowed to be driven, the larger the accumulated number of times of operation of the DPS 20, the higher the possibility that the actual refrigerant discharge pressure of the compressor 10 is included in the allowable pressure range of the DPS 20 but not included in the allowable pressure range of the compressor 10. Accordingly, it is required to selectively reduce the number of times of driving the compressor 10 or delay the point in time of driving the compressor 10, depending on the accumulated number of times of operation of the DPS 20.

The DPS 20 is turned on and transmits a cutting-off request signal every time the actual refrigerant discharge pressure of the compressor 10 comes out of the allowable pressure range of the DPS 20. Accordingly, the accumulated number of times of operation of the DPS 20 is the same as the accumulated number of times of transmitting a cutting-off request signal of the DPS 20.

The DPS 20 is turned off and transmits a cutting-off cancel request signal when the actual refrigerant discharge pressure of the compressor 10 comes into the allowable pressure range of the DPS 20. The cutting-off cancel request signal is a signal that is transmitted by the DPS 20 to cancel cutting-off of the compressor 10.

After primarily allowing the compressor 10 to driven, the operation controller 32 compares a driving-allowance standby time, which is determined based on the accumulated number of times of transmitting a cutting-off request signal of the DPS 20, with the time for which the compressor 10 is actually not driven (S125).

The driving-allowance standby time is the time for which the operation controller 32 has to stand by for re-driving the compressor 10 after the most recent cutting-off of the compressor 10. The driving-allowance standby time should pass after the most recent cutting-off of the compressor 10 in order to start re-driving the compressor 10.

Since there is a possibility of damage due to re-driving of the compressor 10 even though the compressor 10 is primarily allowed to be driven, depending on the accumulated number of times of transmitting a cutting-off request signal of the DPS 20, the driving-allowance standby time of the compressor 10 is determined based on the accumulated number of times of transmitting a cutting-off request signal of the DPS 20.

In detail, the operation controller determines the driving-allowance standby time of the compressor 10 based on the accumulated number of times of transmitting a cutting-off request signal of the DPS after an engine is started and on the real-time temperature of the air outside a vehicle.

The actual non-operation maintenance time of the compressor 10 is the time for which the compressor 10 is actually maintained in the non-operation state. In other words, the actual non-operation maintenance time of the compressor 10 is the time that has passed until the compressor 10 is re-driver after the most recent cutting-off of the compressor 10. The operation controller 32 counts the actual non-operation maintenance time when the compressor 10 is cut off.

The operation controller 32 selectively drives the compressor 10, depending on the result of comparing the driving-allowance standby time with the actual non-operation maintenance time. In detail, the operation controller 32 finally allows the compressor 10 to be driven and drives the compressor 10 when the actual non-operation maintenance time exceeds the driving-allowance standby time (S140). In this case, the operation controller 32 may drive the compressor 10 to follow a target speed that is determined based on a request from a user.

The operation controller 32 does not allow the compressor 10 to be driven when the actual non-operation maintenance time is the driving-allowance standby time or less. In other words, the operation controller 32 keeps the compressor 10 in the non-operation state when the actual non-operation maintenance time is the driving-allowance standby time or less.

Though not shown in FIG. 3, the operation controller 32 may stand by until the actual non-operation maintenance time exceeds the driving-allowance standby time when the actual non-operation maintenance time is the driving-allowance standby time or less. When the actual non-operation maintenance time of the compressor 10 increases over (i.e., is longer than) the driving-allowance standby time, the operation controller 32 may allow the compressor 10 to be driven and drive the compressor 10.

When the compressor 10 is in operation, the operation controller 32 determines whether to keep the compressor 10 in operation based on the estimation discharge pressure of the compressor 10 and whether the DPS 20 has transmitted a cutting-off request signal (S150).

When the first condition that the estimation discharge pressure of the compressor 10 is included in the allowable pressure range of the compressor 10 and the second condition that the DPS 20 does not transmit a cutting-off request signal are both satisfied with the compressor 10 in operation, the operation controller 32 allows the compressor 10 to be driven and keeps the compressor 10 in an operation state (S160).

When even any one of the first condition and the second condition is not satisfied with the compressor 10 in operation, the operation controller 32 cuts off the compressor 10 (S170).

When the operation state of the DPS 20 is changed, the operation controller 32 transmits the transmission signal information of the DPS 20 Lo the estimation map corrector 33. In other words, when the DPS 20 transmits a cutting-off request signal or a cutting-off cancel request signal, the operation controller 32 transmits the transmission signal information of the DPS 20 to the estimation map corrector 33.

Figure 4:
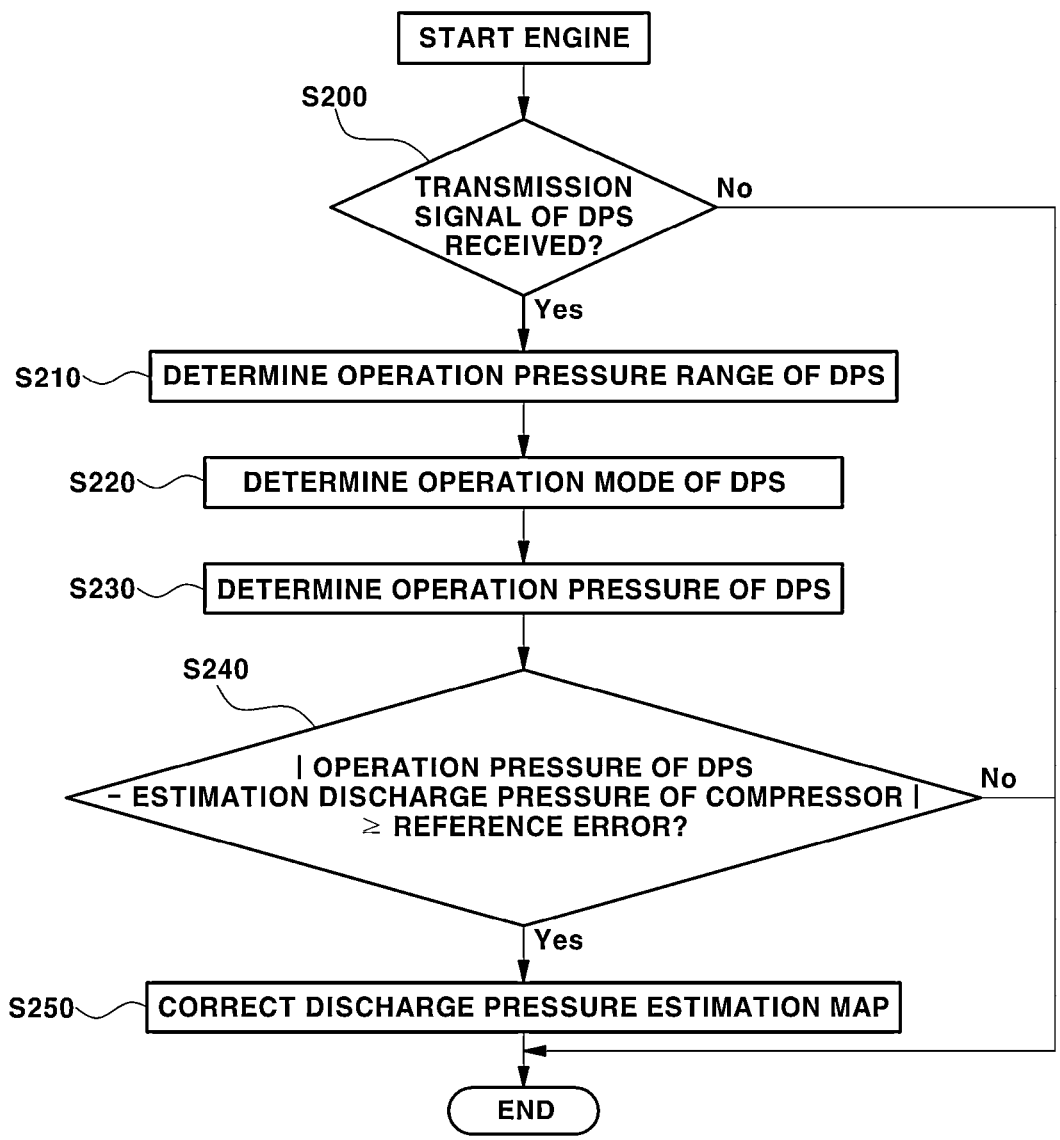
FIG. 4 is a view showing a method of correcting a discharge pressure estimation map by means of an estimation map corrector of a configuration of the device for protecting an air conditioning system according to the present disclosure.

Referring to FIG. 4, the estimation map corrector 33 first determines whether the operation controller 32 receives the transmission signal information of the DPS 20.

When the operation controller 32 receives the transmission signal information of the DPS 20, the estimation map corrector 33 determines the operation pressure range of the DPS 20 using real-time vehicle information and real-time air conditioning system information (S210).

In other words, the estimation map corrector 33 separately determines the operation pressure range when the DPS 20 transmits a cutting-off request signal and the operation pressure range when the DPS 20 transmits a cutting-off cancel request signal based on real-time vehicle information and real-time air conditioning system information.

In detail, the operation pressure range when the DPS 20 transmits a cutting-off request signal may be the first critical pressure that is the low-pressure critical value of the DPS 20 or the second critical pressure that is the high-pressure critical value of the DPS 20. The operation pressure range when the DPS 20 transmits a cutting-off cancel request signal may be determined as a pressure value larger than the first critical pressure by a predetermined level (i.e., a first cutting-off critical pressure) or may be determined as a pressure value smaller than the second critical value by a predetermined level (i.e., a second cutting-off critical pressure). The operation pressures of the DPS 20 are determined based on the operation characteristics of the DPS 20.

For example, assuming that the estimation map corrector 33 determines the operation pressure range of the DPS based on the information of the temperature of the air outside a vehicle, it is possible to determine that the operation pressure range of the DPS 20 is a high-pressure range when the temperature of the air outside the vehicle is 20° C. or more, and it is possible to determine that the operation pressure range of the DPS 20 is a low-pressure range when the temperature of the air outside the vehicle is less than 20° C. Substantially, the estimation map corrector 33 determines the operation pressure range based on the same information as the input variables of the discharge pressure estimation map that the pressure estimator 31 uses when determining the estimation discharge pressure of the compressor 10.

The estimation map corrector 33 determines the operation mode of the DPS 20 based on the transmission signal information of the DPS 20 (S220). In other words, the estimation map corrector 33 can determine whether the operation type of the DPS 20 is a cutting-off mode for requesting cutting-off the compressor 10 or a cutting-off cancel mode for requesting cancel of cutting-off of the compressor 10 based on the transmission signal information of the DPS 20.

Accordingly, the estimation map corrector 33 determines the operation pressure of the DPS 20 based on the operation pressure range and the transmission signal information of the DPS 20 (S230).

In detail, when the DPS 20 operates in the cutting-off mode in the high-pressure range and transmits a cutting-off request signal, the operation pressure of the DPS 20 may be the second critical pressure. When the DPS 20 operates in the cutting-off cancel mode in the high-pressure range and transmits a cutting-off cancel request signal, the operation pressure of the DPS 20 may be the second cutting-off cancel critical pressure.

When the DPS 20 operates in the cutting-off mode in the low-pressure range and transmits a cutting-off request signal, the operation pressure of the DPS 20 may be the first critical pressure. When the DPS 20 operates in the cutting-off cancel mode in the low-pressure range and transmits a cutting-off cancel request signal, the operation pressure of the DPS 20 may be the first cutting-off cancel critical pressure.

Since the DPS 20 is configured to be selectively operated by the actual refrigerant discharge pressure of the compressor 10, it can be seen that the operation pressure of the DPS 20 is a value close to the actual refrigerant discharge pressure of the compressor 10.

Accordingly, the estimation map corrector 33 compares the operation pressure value of the DPS 20 with the estimation discharge pressure value of the compressor 10 (S240). Further, when the difference (i.e., a first pressure difference) between the operation pressure of the DPS 20 and the estimation discharge pressure of the compressor 10 is a predetermined reference error or more, the estimation map corrector 33 corrects the discharge pressure estimation map of the pressure estimator 31 based on the first pressure difference. The estimation map corrector 33 does not correct the discharge pressure estimation map when the first pressure different is less than the reference error.

For example, the estimation map corrector 33 can increase the estimation discharge pressure of the discharge pressure estimation map based on the first pressure difference when the operation pressure of the DPS 20 is higher than the estimation discharge pressure of the compressor 10. The estimation map corrector 33 can also decrease the estimation discharge pressure of the discharge pressure estimation map based on the first pressure difference when the operation pressure of the DPS 20 is lower than the estimation discharge pressure of the compressor 10. The corrected estimation discharge pressure of the discharge pressure estimation map is an estimation discharge pressure that is determined by selecting the real-time vehicle information and the real-time air conditioning system information, which were used to determine the operation pressure range of the DPS 20, as input variables Since the discharge pressure estimation map of the pressure estimator 31 is corrected based on the first pressure difference, the pressure estimator 31 can more accurately estimate the estimation discharge pressure of the compressor 10 when the pressure estimator 31 needs to determine the estimation discharge pressure of the compressor 10 based on the same vehicle information and air conditioning system information. Accordingly, the operation controller 32 can more accurately determine whether to allow the compressor 10 to be driven.

According to the present disclosure, it is possible to prevent damage to the air conditioning system due to excessive operation of the compressor 10 or a deficit of a refrigerant by accurately determining whether to allow the compressor 10 to be driven.

Further, it is possible to optimally control the idling speed of an engine and improve fuel efficiency, similar to when using a sensing value is used for the discharge pressure of the compressor 10, by estimating the driving torque of the compressor 10 based on the estimation discharge pressure determined in the way described above.

Although embodiments of the present disclosure are described above, the terms and words used in the specification and claims should not be construed as being limited to common meanings or meanings in dictionaries. Further, the range (i.e., scope) of the present disclosure is not limited to the embodiments described above. Various changes and modifications based on the fundamental spirit of the present disclosure defined, in the claims by those having ordinary skill in the art are also included in the range of the present disclosure.

What is claimed is:

1. A device for protecting an air conditioning system of a vehicle for controlling the state of interior air in the vehicle, the device comprising:
    a pressure estimator configured to estimate a refrigerant discharge pressure of a compressor for the air conditioning system based on predetermined vehicle information and air conditioning system information, and configured to determine the estimated refrigerant discharge pressure as an estimation discharge pressure of the compressor;
    a dual pressure switch configured to selectively operate, depending on the refrigerant discharge pressure of the compressor, and configured to transmit a cutting-off request signal for cutting off driving of the compressor when the refrigerant discharge pressure of the compressor is not included in a predetermined allowable pressure range of the dual pressure switch; and
    an operation controller configured to determine whether to allow the compressor to be driven and to selectively drive the compressor based on the estimation discharge pressure determined by the pressure estimator, whether the dual pressure switch has transmitted the cutting-off request signal, and the accumulated number of times of transmitting the cutting-off request signal of the dual pressure switch, when it is required to drive the compressor.

2. The device of claim 1, wherein the operation controller:
    determines a driving-allowance standby time based on the accumulated number of times of transmitting the cutting-off request signal of the dual pressure switch when a first condition that the estimation discharge pressure is included in the predetermined allowable pressure range of the compressor and a second condition that the dual pressure switch does not transmit a cutting-off request signal are both satisfied; and
    allows the compressor to be driven and drives the compressor when an actual non-operation maintenance time of the compressor exceeds the driving-allowance standby time.

3. The device of claim 2, wherein the operation controller does not allow the compressor to be driven and keeps the compressor in a non-operation state when the actual non-operation maintenance time of the compressor is the driving-allowance standby time or less.

4. The device of claim 2, wherein the operation controller does not allow the compressor to be driven and keeps the compressor in a non-operation state when even any one of the first condition and the second condition is not satisfied.

5. The device of claim 2, wherein the operation controller keeps the compressor in an operation state when the first condition and the second condition are both satisfied with the compressor in operation.

6. The device of claim 2, wherein the operation controller cuts off the compressor when even any one of the first condition and the second condition is not satisfied with the compressor in operation.

7. The device of claim 2, wherein the operation controller determines the driving-allowance standby time based on the accumulated number of times of transmitting the cutting-off request signal of the dual pressure switch after an engine is started, and the temperature of the air outside the vehicle.

8. The device of claim 1, further comprising an estimation map corrector configured to correct a discharge pressure estimation map of the pressure estimator based on a difference between an operation pressure of the dual pressure switch and the estimation discharge pressure of the compressor when the difference is a predetermined reference error or more,
    wherein the pressure estimator has the discharge pressure estimation map configured to determine the estimation discharge pressure of the compressor, using the predetermined vehicle information and air conditioning system information as input variables.

9. The device of claim 8, wherein the operation pressure of the dual pressure switch is determined based on transmission signal information and operation pressure range information of the dual pressure switch, and
    wherein the operation pressure range information of the dual pressure switch is determined as any one of a high-pressure range and a low-pressure range based, on the real-time vehicle information and the real-time air conditioning system information.

10. The device of claim 9, wherein the estimation map corrector determines the operation pressure range information of the dual pressure switch based on vehicle information and air conditioning system information determined to be the same as input variables of the discharge pressure estimation map, and wherein the transmission signal of the dual pressure switch is any one of a cutting-off request signal or a cutting-off cancel request signal.

* * * * *